July 12, 1949.　　　　　F. G. DANHIER　　　　　2,475,594
GAS-ELECTRIC CUTTING OR WELDING TORCH
Filed June 4, 1945　　　　　　　　　　　　2 Sheets-Sheet 2

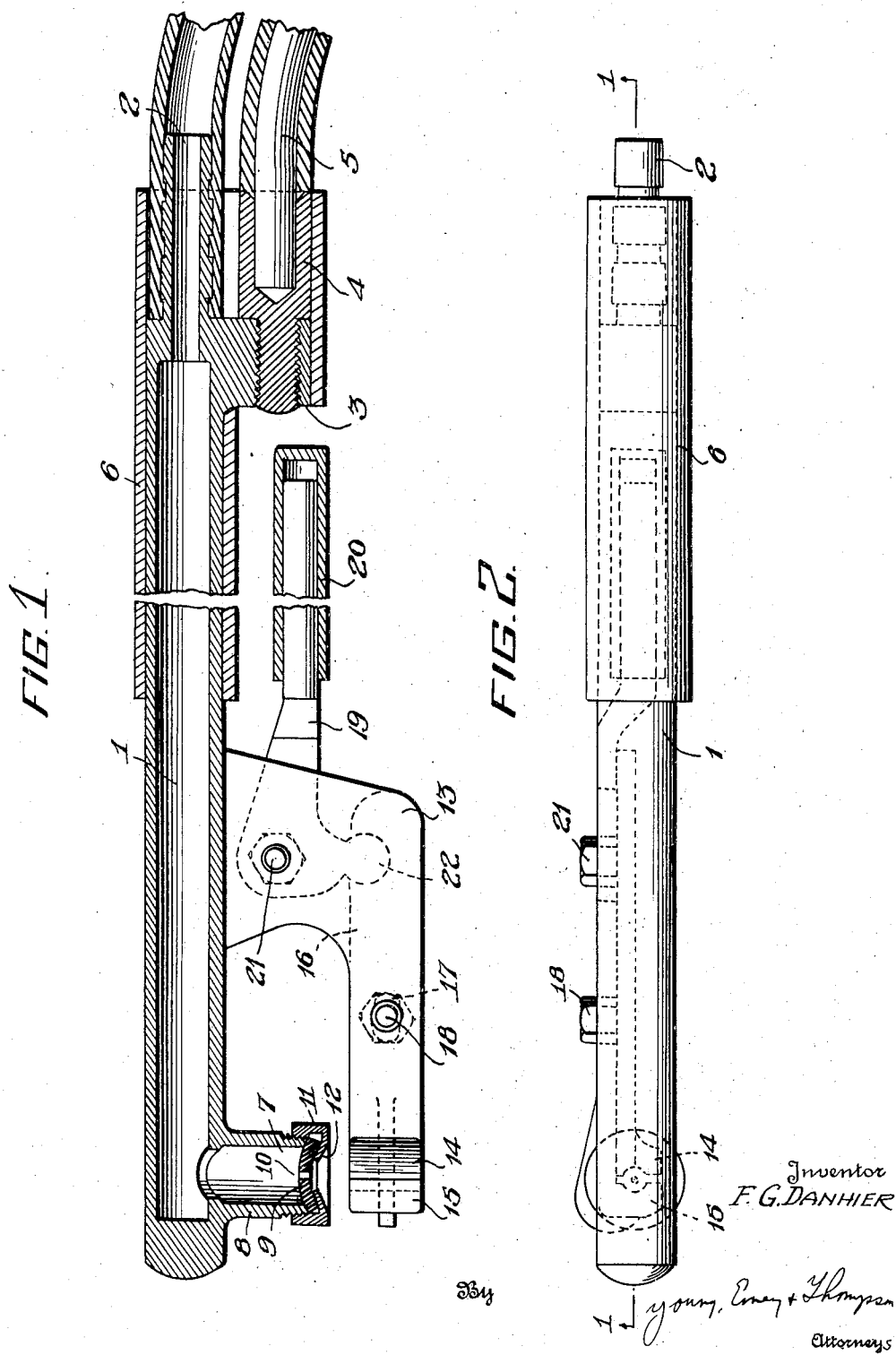

Inventor
F. G. DANHIER
By Young, Emery & Thompson
Attorneys

Patented July 12, 1949

2,475,594

UNITED STATES PATENT OFFICE 2,475,594

GAS-ELECTRIC CUTTING OR WELDING TORCH

François Georges Danhier, Schaerbeek, Belgium, assignor to La Soudure Electrique Autogène Societé Anonyme, Brussels, Belgium Application June 4, 1945, Serial No. 597,510
In Belgium January 19, 1945

4 Claims. (Cl. 219—15)

This invention has for its object a device to be used as an electrode-holder for the so-called "gas electrodes" intended to be used for oxy-electric cutting or electric arc welding in an atmosphere of gas and which permits the simultaneous supply of electric current and gas to the electrode.

In the processes for oxy-electric cutting and electric arc welding in an atmosphere of gas, making use of electrodes with a gas jet directed through an inner passage or channel in the electrode, it was important—at each work interruption for changing the electrode—to avoid effecting two distinct operations, i. e., the gripping or tightening of the extremity of the electrode in a grip connecting it with the source of electric current, and the connection of said electrode, through a conduit or pipe, with the source of the oxydizing or reducing gas intervening in the process of oxy-electric cutting or electric arc welding in an atmosphere of gas.

The present invention provides a single device permitting not only to supply simultaneously gas and electric current to the electrodes used in the various processes, but also to provide a tight connection of said electrodes by a single and simple manipulation, without the necessity of having the electrodes provided with a screw-threaded extremity or other means.

According to the invention, the device for supplying electric current and gas to an electrode of the above type comprises in principle a gripping member in contact with the source of electric current, intended to maintain the electrode in such a manner that the inner channel of the latter will be directly and tightly joined with a conduit connected with the source of gas.

In an electrode-holder according to the invention, this gripping device may consist of a tong-like grip, the good conducting jaws of which are connected with the source of electric current and act to maintain the extremity of the electrode along the axis of and below a gas chamber into which it tightly penetrates. The conduit through which the gas is supplied to said chamber is connected to the source of gas, forming simultaneously the handle of the electrode-holder, the shank of said grip being made integral with said handle.

The accompanying drawings represent an embodiment of a device according to the invention for an electrode-holder.

Figure 1 is a sectional view of the electrode-holder taken on line I—I of Figure 2.

Figure 2 is a plan view corresponding to Figure 1.

Figure 3:
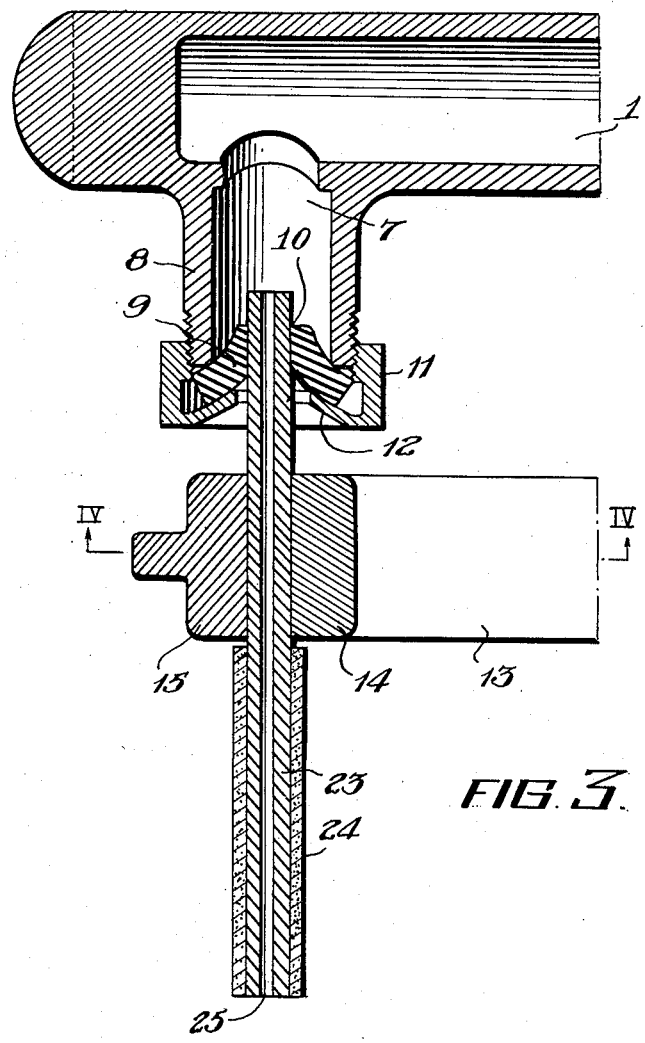
Figure 3 is a sectional view on an enlarged scale of the outer part of the device of Figure 1 showing a gas electrode inserted in the electrode-holder.

In the figures, like reference characters designate like parts throughout. As shown in the drawings, the supply conduit 1 for the gas under pressure is terminated at one extremity by the nipple 2 for a rubber hose and by a projection 3 wherein the nipple for the connection with the electric cable 5 is engaged. This input extremity of the electrode-holder is surrounded by an insulating sleeve 6 and forms the handle of the electrode-holder. At the other closed extremity of the conduit 1 a gas chamber 7 is formed by a tubular seat 8 on which is screwed, with interposition of a rubber membrane 9 provided with a circular opening 10, a tightening nut 11 with a tapered hole 12 registering axially with the opening 10 of the membrane 9. An arm 13 fastened to the conduit 1, extends below the gas chamber 7 and forms right angle cranks at its extremity 14, one fixed to a jaw of the grip for holding fast the gas electrode and supplying it with electric current. The other movable jaw of this grip is formed by the extremity 15, extending at right angles from a sliding member 16 adapted to be moved parallel to the arm 13 along the same by means of an eyelet 17 engaged on a bolt 18 which is fastened on the arm 13.

The length of the arm 13 and the sliding member 16 is so dimensioned that the jaws 14 and 15 work exactly in the perpendicular axis of the chamber 7 and correspond to the axis of the respective openings 10 and 12 of the membrane 9 and the nut 11.

The mechanism of this electrode grip, known per se, comprises a lever 19 extending into an insulated hand lever 20 and pivoted, on the one hand, at 21 on the fixed arm 13 and, on the other hand, at 22 on the other extremity of the sliding member 16.

Figure 4:
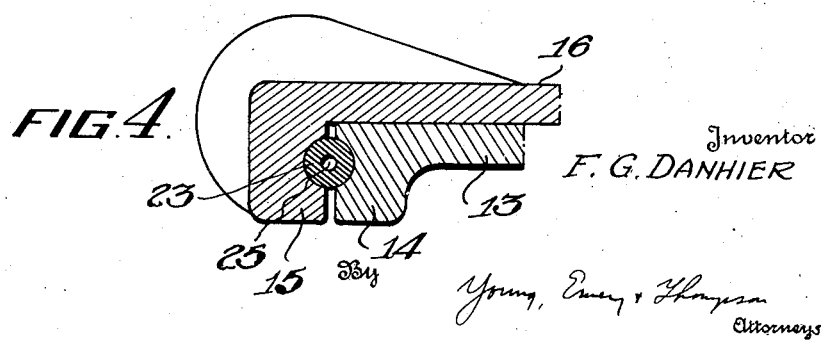
Figure 4 is a section taken on line IV—IV of Figure 3.

In Figures 1 and 2 the grip is shown in the closed position, while in Figures 3 and 4 the jaws are exactly below and in a line with the axis of the gas chamber, the bared and good conducting part 23 of a covered gas electrode 24, engaging in the electrode-holder. As clearly shown in Figures 3 and 4, this engagement can be effected by a single manipulation, by acting on the hand lever 20 to simultaneously insert the end of the electrode between the spread out jaws 14, 15 and, by passing through the opening 12, into the opening 10 in the elastic membrane 9 of the gas chamber 7. It will be understood that in the embodiment shown by way of example, this elastic membrane forms a perfectly tight joint around the metal core of the electrode, the channel 25 of which only provides free passage to the gas jet in accordance with the purpose of the invention.

What I claim is:

1. A device for supplying simultaneously electric current and gas to a hollow electrode for electric arc welding or for electric arc cutting or the like in an atmosphere of gas, comprising a holder body having an interior passage, means for connecting said passage to a source of gas, a push connection to said passage and adapted to receive through it the end of an electrode and seal thereto, cooperating jaws in line with said push connection, means for supplying electric current to the cooperating jaws, lever means for locking the jaws, whereby the jaws provide electrical connection to the electrode and a locking means to hold the electrode in the push connection.

2. A device for supplying simultaneously electric current and gas to a hollow electrode for electric arc welding or for electric arc cutting or the like in an atmosphere of gas, comprising a holder body having an interior passage, means for connecting said passage to a source of gas, a push connection to said passage and adapted to receive through it the end of an electrode and seal thereto, a jaw integral with said body, a second jaw integral with a single hand lever, a pivot for said hand lever mounted on a projection of the body, said jaws maintaining the electrode in the push connection, and means for supplying electric current to at least one of said jaws.

3. A device for supplying simultaneously electric current and gas to a hollow electrode for electric arc welding or for electric arc cutting or the like in an atmosphere of gas, comprising a holder body having an interior passage, means for connecting said passage to a source of gas, a push connection to said passage and adapted to receive through it the end of an electrode, a perforated elastic member to seal around the end of the electrode, cooperating jaws in line with said push connection, means for supplying electric current to the cooperating jaws, lever means for locking the jaws, whereby the jaws provide electrical connection to the electrode and a locking means to hold the electrode in the push connection.

4. A device for supplying simultaneously electric current and gas to a hollow electrode for electric arc welding or for electric arc cutting or the like in an atmosphere of gas, comprising a holder body having an interior passage, means for connecting said passage to a source of gas, a perforated elastic membrane to seal around the end of the electrode and forming a wall of said interior passage, means for bending the central part of said elastic membrane towards said interior passage, such means being out of contact with said central part, a gripping member for maintaining the electrode in said position, and means for supplying electric current to said gripping member.

FRANÇOIS GEORGES DANHIER.

REFERENCES CITED

The following references are of record in the file of this patent:

UNITED STATES PATENTS

| Number | Name | Date |
| --- | --- | --- |
| 2,371,945 | Barbeck | Mar. 20, 1945 |

FOREIGN PATENTS

| Number | Country | Date |
| --- | --- | --- |
| 236,098 | Great Britain | July 2, 1925 |